United States Patent [19]

Shuji

[11] Patent Number: 4,943,467

[45] Date of Patent: Jul. 24, 1990

[54] PRINTING PLATES FOR CORRUGATED BOARD

[75] Inventor: Inoue Shuji, Tsu, Japan

[73] Assignee: Kureha Rubber Industry Co., Ltd., Osaka, Japan

[21] Appl. No.: 288,904

[22] Filed: Dec. 23, 1988

[30] Foreign Application Priority Data

Dec. 24, 1987 [JP] Japan ........................ 62-1927238[U]
Apr. 11, 1988 [JP] Japan ........................ 63-48700[U]

[51] Int. Cl.[5] .......................... B41N 1/00; B32B 3/30

[52] U.S. Cl. .................................. 428/159; 428/213; 428/215; 428/217; 428/317.1; 428/318.6; 428/319.3; 428/319.7; 428/908; 428/909; 101/395; 101/401.1

[58] Field of Search ............... 428/159, 213, 215, 217, 428/319.3, 319.7, 908, 909, 317.1, 318.6; 101/395, 401.1

[56] References Cited

U.S. PATENT DOCUMENTS

| | | | |
|---|---|---|---|
| 4,234,640 | 11/1980 | Wittel | 101/395 |
| 4,303,721 | 12/1981 | Rodriguez | 428/213 |
| 4,388,363 | 6/1983 | Fountain | 101/401.1 |
| 4,812,357 | 3/1989 | O'Rell et al. | 428/319.3 |

*Primary Examiner*—William J. Van Balen
*Attorney, Agent, or Firm*—Millen, White & Zelano

[57] ABSTRACT

The invention relates to a printing plate for corrugated board which comprises a rubber or plastic foam sheet having a smooth skin layer on its surface, the thickness of the skin layer being 0.3 to 2.0 mm and the surface hardness of the printing plate is SRIS (C) 35 to 55. Preferably, the surface roughness of the skin layer is not more than JIS $R_{max}=100$ μm. Preferably, the printing plate further includes a reinforcing sheet comprising a base cloth and a rubber or resin cladding layer disposed on either side thereof and the interface between the foam sheet and one surface of the base cloth of the reinforcing sheet is separably bonded with comparatively weak adhesion.

18 Claims, 2 Drawing Sheets

PRINTING PLATES FOR CORRUGATED BOARD

BACKGROUND OF THE INVENTION

The present invention relates to a printing plate for corrugated board

The hitherto-known printing plates for corrugated board include a vulcanized assembly comprising a face layer and a reverse layer, each made of natural or synthetic rubber with a JIS rubber hardness of 30 to 60, and a textile or other reinforcing sheet interposed between said layers and a vulcanized assembly comprising a reverse rubber layer, a reinforcing sheet, an intermediate rubber layer and a thin face rubber layer built up in the order mentioned, said reverse rubber layer and intermediate rubber layer having a JIS rubber hardness of 30 to 60 and said face rubber layer having a JIS rubber hardness lower by 10 to 20 than the hardness of said intermediate rubber layer (Japanese Utility Model Publication No. 52064/1981).

The conventional printing plates for corrugated board are invariably solid rubber plates but there is a lower limit to hardness and it is impossible to lower the hardness to less than the JIS-A rubber hardness of 20. If the hardness is reduced to less than 20, the printing plate will be too soft to preclude an uneven print. On the other hand, if a material plate having a hardness of 30 or more is sculptured to prepare a relief printing plate and a corrugated board is printed using it, the printing pressure will be so high that an excess of printing ink deposits on the leading side of the projections of the plate to yield the so-called marginal zone. Another trouble is that the interliner is crushed by the printing pressure to cause a decrease in board strength Particularly when the corrugated board is scored for folding and printed across the scores, the printing ink is not readily deposited at the scores to cause a local omission of printing. Attempting to overcome this drawback by increasing the printing pressure results in collapse of the interliner.

It is an object of this invention to provide an improved printing plate free of the above-mentioned disadvantages, wherein a rubber or resin foam sheet is used for reducing the required printing pressure to prevent a decrease in board strength, eliminating the occurrence of said marginal zone and the uneven impression at folding scores to assure a uniform and sharp print and facilitating removal of unwanted areas in sculpturing.

SUMMARY OF THE INVENTION

The above-mentioned and other objects are accomplished by providing a printing plate comprising a rubber or plastic foam layer having a smooth surface layer in the thickness of 0.3 to 2.0 mm and a surface hardness of SRIS (C) 35–55.

The printing plate of this invention is manufactured by backing a sculptured rubber or plastic foam surface layer with a reinforcing sheet consisting of a base cloth and a rubber or resin cladding layer disposed on either side thereof, with said foam sheet being inseparably bonded to one of the interfaces between the base cloth and cladding layers of said reinforcing sheet. The peeling strength of said releasable interface is 0.5 to 3.0 kg/25 mm and the peeling strength of the remaining unreleasable interface is preferably not less than 4 kg/25 mm. Only if the above bond strength is obtainable, said releasable interface may be constituted by a vulcanized bond, an adhesive bond, a two-sided adhesive tape or any other appropriate bonding means.

DETAILED DESCRIPTION OF THE PREFERRED EMBODIMENTS

Figure 1:
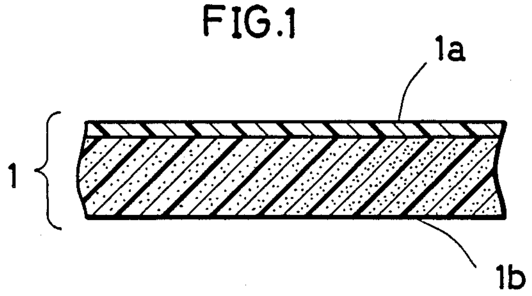
FIG. 1 is a sectional view showing a printing plate for corrugated board according to this invention.

Referring to FIG. 1, a printing plate made of a rubber or resin foam sheet 1 comprises a foam layer 1*b* and a smooth skin layer la disposed on top of said foam layer 1*b*, said skin layer 1*a* having a thickness of 0.3 to 2.0 mm and an SRIS (C) hardness of 35 to 55. If the surface hardness of the printing plate is less than 35, the plate will be too soft to preclude an uneven print, while an SRIS (C) hardness in excess of 55 will provide an excess printing pressure as does the conventional solid rubber plate. This, coupled with the provision of a smooth skin layer 1*a*, assures that the printing ink is deposited evenly on the board surface, producing an even print However, if the thickness of the skin layer 1*a* is less than 0.3 mm, the durability will be adversely affected, while if the thickness exceeds 2.0 mm, the dimensional stability of the plate is sacrificed to cause curling and produce an excess printing pressure as does the conventional solid rubber plate.

The surface roughness of the skin layer 1*a* is preferably not more than JIS $R_{max}=100$ μm. If it exceeds 100 μm, an uneven print will tend to be produced.

According to the embodiment shown in FIG. 1, a printing plate was prepared from natural rubber. This printing plate had a skin layer 1*a* with a thickness of 0.5 mm, a surface hardness of SRIS (C) 47, a skin layer surface roughness of JIS 10-point mean roughness of Rz=11 μm and a JIS maximum height of $R_{max}=15$ μm. On the other hand, a control solid rubber printing plate was fabricated using the same kind of natural rubber with a JIS-A hardness of 40. Each of these printing plates was sculptured and mounted on the plate drum of a corrugated board printing press and a corrugated board [paper quality RK 220 g/m$^2$×SCP 160 g/m$^2$×MC 200 g/m$^2$, B-flute, sized (box inner size) 480×373 151 mm, R-form (Type A)] was printed at a printing pressure (clearance between the surface of the printing plate and the drum) of 2.5 mm and a drum speed of 60 RPM and the changes in thickness of the corrugated board and the compressive strengths of corrugated board boxes were compared The results are shown in Table 1.

TABLE 1

| | | This invention | Control |
|---|---|---|---|
| Thickness of corrugated board (mm) | Before printing | 2.844 | 2.844 |
| | After printing | 2.825 | 2.736 |
| | Loss | 0.019 | 0.108 |

TABLE 1-continued

| | | This invention | Control |
|---|---|---|---|
| Compressive strength of corrugated board box (kgf) | Before printing | 164.2 | 164.2 |
| | After printing | 161.4 | 155.0 |
| | Loss | 2.8 | 9.2 |

It is apparent from the above table that with the printing plate of this invention, the loss of thickness was as low as about 18% and the loss of compressive strength as low as about 30%, both compared with the control plate. Substantially no difference was found in the uniformity of impression between the printing plate of this invention and the control printing plate. However, an uneven print developed frequently with a printing plate of a foam sheet having a thin (0.3 mm) skin layer with a JIS 10-point mean roughness of Rz=37 and a JIS maximum height of $R_{max}$=55.

Figure 2:
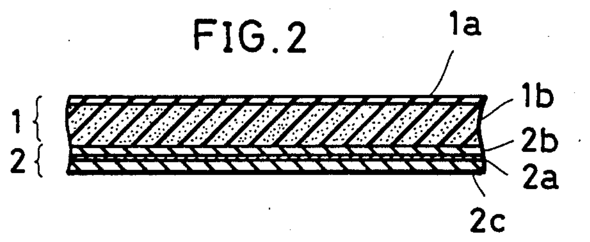
FIG. 2 is a sectional view of the printing plate illustrated in FIG. 1 which is provided with a reinforcing sheet.

Referring to the printing plate illustrated in FIG. 2, this printing plate comprises a surface rubber layer 1 which is a natural rubber foam sheet having a thickness of 6 mm and has a surface skin layer 1*a* which is 0.5 mm thick. The surface skin layer 1*a* has a surface JIS 10-point mean roughness of Rz=11 and a JIS maximum height of $R_{max}$ =15 μm which provides a printing surface. The printing plate further comprises a reinforcing sheet 2 which consists of a base cloth 2*a* having first and second surfaces and first and second 0.85 mm thick rubber cladding layers 2*b*, 2*c* vulcanized to the first and second sides, respectively, of the base cloth, with the underside of said surface foam rubber layer 1 with the aid of a two-sided acrylic adhesive tape (not shown) in such a manner that foam rubber layer can be peeled off. The peeling strength was 1.2 kg/25 mm.

Figure 3:
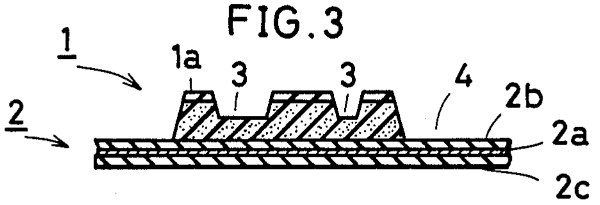
FIG. 3 is a sectional view showing the printing plate illustrated in FIG. 2 which has been sculptured.

The surface rubber layer 1 of this printing plate was sculptured as shown in FIG. 3. Thus, the unwanted portions of narrow width were formed into shallow recesses 3 by cutting off the surface of the surface rubber layer (rubber foam sheet), while the unwanted portions of broad width were formed into deep recesses 4 by cutting through the surface rubber layer 1 from its surface to the surface of the upper rubber cladding layer 2*b* of the reinforcing sheet 2 and peeling off the surface rubber layer from the interface. In addition, in order to prevent peeling in the course of printing, the edges of wanted portions were reinforced with a chloroprene rubber adhesive.

A control printing plate was fabricated in the same manner except that a solid natural rubber sheet with a JIS-A hardness of 40 was used in lieu of the surface rubber layer 1 and was similarly sculptured.

Each of the above printing plates was mounted on the plate drum of a corrugated board printing press and a corrugated board [paper quality RK 220 g/m$^2$×SCP 160 g/m$^2$×MC 200 g/m$^2$, B-flute, size (inner size of box) 480×373×151 mm, R-foam (Type A)] was printed at a printing pressure (clearance between the surface of the printing plate and the drum) of 2.5 mm and a drum speed of 60 RPM. After 17 hours of cumulative operation on an intermittent basis, no peeling was found of the surface rubber layer 1 in the relief areas. Comparison of changes in the thickness of corrugated board and the compressive strength (JIS Z 0212) of corrugated board boxes showed the following results.

TABLE 2

| | | This invention | Control |
|---|---|---|---|
| Thickness of corrugated board (mm) | Before printing | 2.844 | 2.844 |
| | After printing | 2.820 | 2.736 |
| | Loss | 0.024 | 0.108 |
| Compressive strength of corrugated board box (kgf) | Before printing | 164.2 | 164.2 |
| | After printing | 161.7 | 155.0 |
| | Loss | 2.5 | 9.2 |

It is apparent from the above table that with the printing plate of this invention, the loss of thickness was as low as about 22% and the loss of compressive strength as low as about 27%, both compared with the control plate. Substantially no uneven impression occurred with either printing plate.

Figure 4:
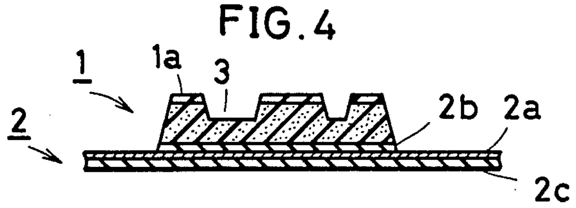
FIG. 4 is a view similar to FIG. 3, showing a sculptured printing plate as another embodiment of the invention.

In the printing plate illustrated in FIG. 4, a base cloth 2*a* of a reinforcing sheet 2 and an upper rubber cladding layer 2*b* are separably bonded to each other with a natural rubber adhesive having a comparatively week adhesive power, while the upper rubber cladding layer 2*b* and the underside of the surface rubber layer 1 are inseparably bonded to each other with a chloroprene rubber adhesive having a comparatively high adhesive power. Then, after incisions are made down to the top of the base cloth 2*a*, the surface rubber layer 1 together with the upper rubber cladding layer 2*b* of reinforcing sheet 2 is peeled off. In this case, the rubber foam sheet of surface rubber layer 1 can be more readily peeled off without the risk of breakage of the rubber foam sheet, with the result that the peeled surface is neat and the adhesive power of the adhesive can be increased.

Figure 5:
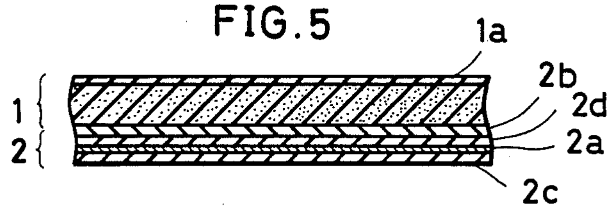
FIG. 5 is a view similar to FIG. 2, showing a printing plate as another embodiment of the invention.
Figure 6:
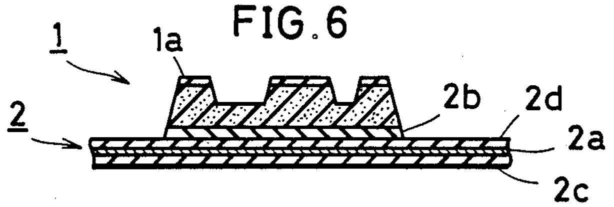
FIG. 6 is a sectional view showing the printing plate of FIG. 5 which has been sculptured.

In the printing plate illustrated in FIG. 5, a peeling rubber layer 2*d* is interposed between the upper rubber cladding layer 2*b* of reinforcing sheet 2 and the base cloth 2*a*, and the upper rubber cladding layer 2*b* of reinforcing sheet 2 and the rubber surface layer 1 are initimately bonded to each other while the upper rubber cladding layer 2*b* of reinforcing sheet 2 and the peeling rubber layer 2*d* are bonded comparatively weakly to each other. Then, as shown in FIG. 6, incisions are made down to the interface between the upper rubber cladding layer 2*b* of reinforcing sheet 2 and the peeling rubber layer 2*d*. Thereafter, the surface rubber layer 1 together with the upper rubber cladding layer 2*b* of reinforcing sheet 2 is peeled off.

What is claimed is:

1. A printing plate for printing on corrugated paper board, the printing plate comprising:

a rubber or resin foam sheet comprising a foam layer, the foam layer having a single skin layer directly integral therewith, the single skin layer having a smooth surface, the thickness of the single skin layer being less than that of the foam layer and being in the range of about 0.3 to 2.0 mm and the smooth surface having a hardness in the range of about SRIS(c) 35 to 55;

a cladding covered base cloth forming a reinforcing sheet for the foam sheet; and means for securing releasably with adhesive the foam sheet to the reinforcing sheet, whereby the printing plate can be sculptured to provide a printing surface in relief by removing portions of the smooth skin layer to provide relatively shallow recesses and removing portions of the foam sheet by cutting the printing plate at least as deep as the thickness of the foam sheet and thereafter peeling the foam sheet from the reinforcing sheet to form relatively deep recesses.

2. The printing plate of claim 1, wherein the surface roughness of the smooth surface is no greater than JIS $R_{max}=100$ μm.

3. A printing plate for corrugated board as claimed in claim 1, wherein said means for securing releasably with adhesive the foam sheet to the reinforcing sheet comprises two-sided adhesive tape disposed between the reinforcing sheet and foam sheet.

4. A printing plate for corrugated board as claimed in claim 1, wherein said cladding covered base cloth includes a cladding layer bonded to the base cloth and wherein said means for securing releasably the foam sheet to the reinforcing sheet includes an inseparable adhesive bonding the foam sheet to the cladding layer and relatively weak adhesive bonding the cladding layer to the base cloth.

5. A printing plate for corrugated board as claimed in claim 1, wherein said foam sheet is made of natural rubber.

6. A printing plate for corrugated board as claimed in claim 1, wherein said foam sheet is made of polyvinyl chloride.

7. A printing plate for corrugated paper board comprising:

a foam sheet having a skin layer with a thickness in the range of about 0.3 to 2 mm, the skin layer providing a printing surface of a selected smoothness and a SRIS(c) hardness in the range of about 35 to 55; the foam sheet further having a foam layer of a selected thickness greater than that of the skin layer;

a base cloth underlying the foam sheet and having a first surface facing the foam sheet and a second surface facing away from the foam sheet;

rubber cladding means comprising a rubber cladding disposed between the base cloth and foam sheet and being adhered to the foam sheet and adhesively secured with respect to the base cloth;

relatively shallow recesses sculpted into the foam sheet, the relatively shallow recesses having a depth at least as deep as the thickness of the surface skin layer of the foam sheet but not as deep as the thickness of the foam; and relatively deep recesses having a depth at least as deep as the thickness of the foam layer and surface skin layer combined and extending no deeper than the base cloth, wherein the relatively deep and relatively shallow recesses form a printing plate with surface relief having printing surfaces defined by those portions of the surface skin layer not deleted by the relatively shallow and relatively deep recesses.

8. The printing plate according to claim 7, wherein the skin layer has a surface roughness that does not exceed JIS $R_{max}=100$ μm.

9. The printing plate according to claim 7, wherein the base cloth is inseparably vulcanized to the rubber cladding layer, while the foam sheet is peelably bonded to the cladding layer with a two-sided adhesive tape.

10. The printing plate of claim 9, wherein the relatively deep recesses are formed by cutting the printing plate through the printing surface of the skin layer in a direction substantially transverse of the skin layer only to the cladding layer and then peeling away only the foam sheet in portions delineated by the cutting of the printing plate.

11. The printing plate according to claim 7, wherein the base cloth is separably bonded to the rubber cladding layer with a natural rubber cement, while the foam sheet is inseparably bonded to the rubber cladding layer with a chloroprene rubber cement.

12. The printing plate of claim 11, wherein the relatively deep recesses are formed by cutting the printing plate through the printing surface of the skin layer in a direction substantially transverse of the skin layer past the cladding layer to the base cloth and peeling away the foam sheet and cladding layer in portions delineated by the cutting of the printing plate.

13. The printing plate of claim 7, wherein the rubber cladding means includes a peeling rubber layer separably bonded to the rubber cladding layer and inseparably bonded to the foam sheet.

14. The printing plate of claim 13, wherein the relatively deep recesses are formed by cutting the printing plate through the printing surface of the skin layer in a direction substantially transverse of the skin layer only to the peeling rubber layer and then peeling from the peeling rubber layer those portions of the cladding layer and foam layer delineated by the cutting of the printing plate.

15. The printing plate according to claim 7, wherein the foam sheet is made of natural rubber.

16. The printing plate according to claim 7, wherein the foam sheet is made of polyvinyl chloride.

17. The printing plate according to claim 7, further including a second rubber cladding layer inseparably vulcanized to the base cloth on the second side thereof.

18. The printing plate of claim 7, wherein the relatively deep recesses are formed by cutting the printing plate through the printing surface in a direction substantially transverse of the printing surface to a depth at least as deep as the cladding layer and peeling away at least the foam sheet in portions delineated by the cutting of the printing plate.

* * * * *

UNITED STATES PATENT AND TRADEMARK OFFICE
CERTIFICATE OF CORRECTION

PATENT NO. : 4,943,467

DATED : July 24, 1990

INVENTOR(S) : Inoue SHUJI

It is certified that error appears in the above-identified patent and that said Letters Patent is hereby corrected as shown below:

Title page, field [30], Foreign Application Priority Data:

reads "Dec. 24, 1987 [JP] Japan...............62-1927238[U]
Apr. 11, 1988 [JP] Japan.................63-48700[U]"

should read -- Dec. 24, 1987 [JP] Japan............... 62-197238[U]
Apr. 11, 1988 [JP] Japan............... 63-48700[U]

Signed and Sealed this

Eighth Day of October, 1991

Attest:

HARRY F. MANBECK, JR.

*Attesting Officer* *Commissioner of Patents and Trademarks*